L. MILLER.
METHOD OF PRODUCING MOTION PICTURE FILMS.
APPLICATION FILED MAR. 31, 1914.
1,232,359.
Patented July 3, 1917.
2 SHEETS—SHEET 1.
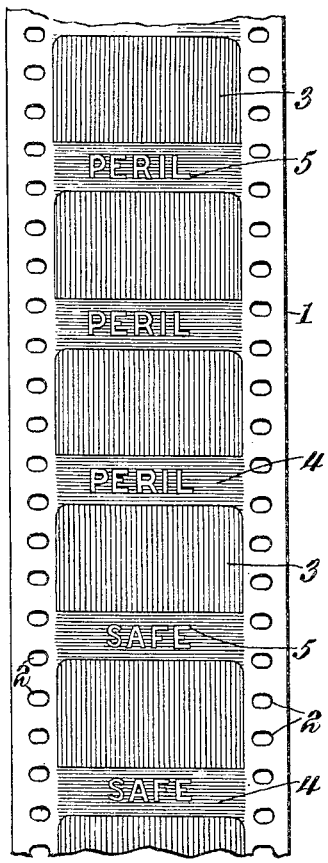
Fig. 1.
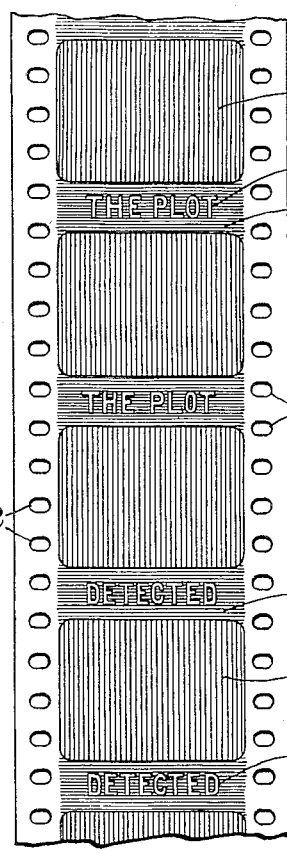
Fig. 2.
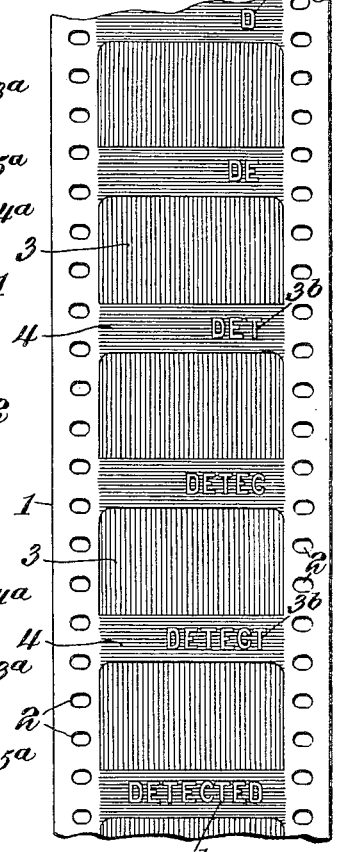
Fig. 3.
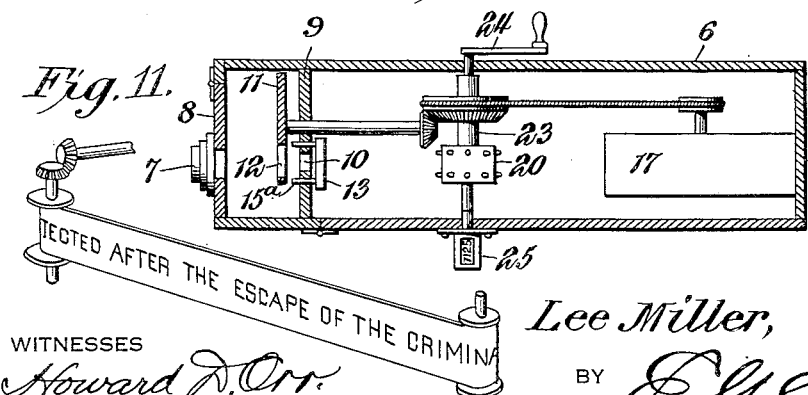
Fig. 4.
Fig. 11.
WITNESSES
Howard D. Orr
F. T. Chapman
Lee Miller, INVENTOR,
BY E. G. Siggers,
ATTORNEY L. MILLER.
METHOD OF PRODUCING MOTION PICTURE FILMS.
APPLICATION FILED MAR. 31, 1914.
1,232,359.
Patented July 3, 1917.
2 SHEETS—SHEET 2.
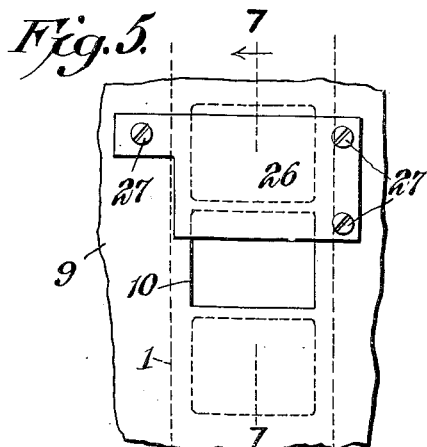
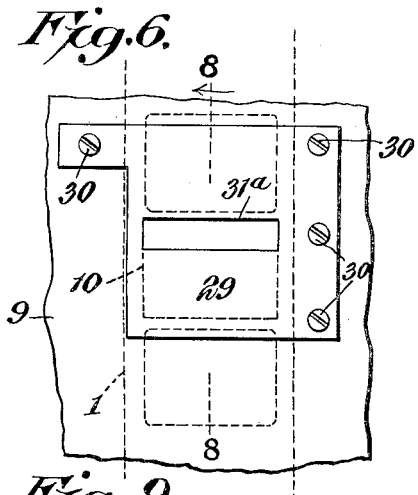
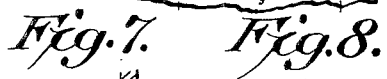
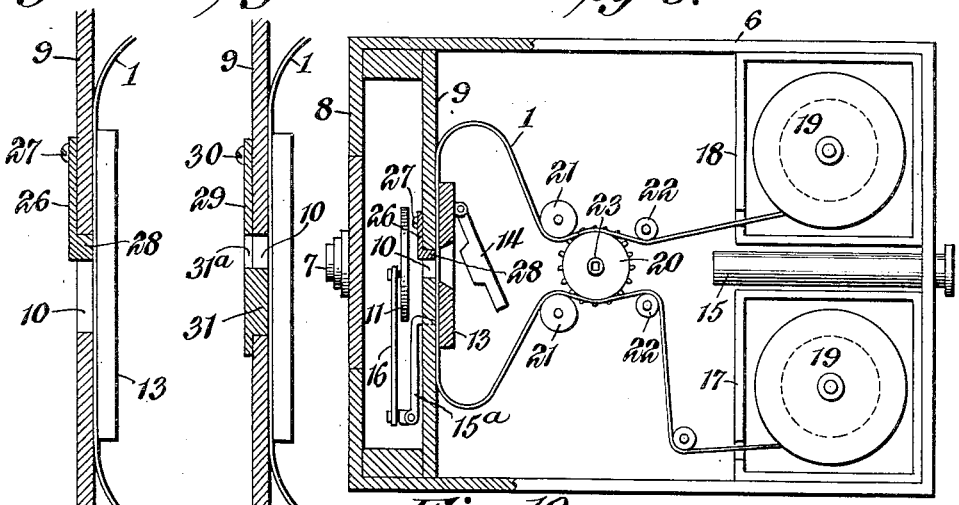
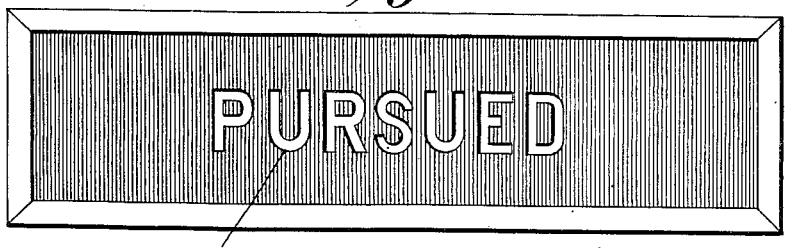
Lee Miller, INVENTOR,
BY E. G. Siggers
ATTORNEY
WITNESSES
Howard D. Orr
F. T. Chapman.

UNITED STATES PATENT OFFICE.

LEE MILLER, OF CHICAGO, ILLINOIS.

METHOD OF PRODUCING MOTION-PICTURE FILMS.

1,232,359.  Specification of Letters Patent.  Patented July 3, 1917.

Application filed March 31, 1914. Serial No. 828,595.

*To all whom it may concern:*

Be it known that I, LEE MILLER, a citizen of the United States, residing at Chicago, in the county of Cook and State of Illinois, have invented a new and useful Method of Producing Motion-Picture Films, of which the following is a specification.

This invention has reference to improvements in the method of producing motion picture films, and its object is to provide a motion picture film with descriptive words or phrases accompanying the individual pictures, the wording changing with the change of scene or other condition represented by the pictures.

It is the custom in motion picture exhibitions to throw upon the screen suitable descriptive matter, and this matter is followed by motion pictures without descriptive matter until the next important subject is to be described.

With the present invention the description progresses simultaneously with the scenes or other pictures, and the beholder does not have to depend upon memory for the explanation of what is being observed upon the screen.

In order to carry out the present invention the motion pictures are taken in the usual way, but each picture is separated from its neighbor by a narrow space which may be equivalent to the spacing of the usual perforations along the edges of the film, in which case the height of the picture is correspondingly reduced, or pictures of full height may be spaced apart by distances equal to the usual distances between the perforations, in which case a slight change in the driving mechanism of the photographing and projecting instruments is necessary. In either case the title will appear upon the screen below the bottom of the picture, and in order to avoid distracting glares, it is preferable to have the title appear in white upon a black background.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—

Figure 1 is a somewhat exaggerated view of a fragment of a positive film embodying the present invention.

Fig. 2 is a similar view of a modified form of the film.

Fig. 3 is a view showing a still further modification.

Fig. 4 is a cross section of a known form of motion picture photographing machine with an attachment useful in the production of the films of the present invention.

Fig. 5 is a fragmentary view showing a cut out attachment for a motion picture photographing machine.

Fig. 6 is a view of another attachment for the photographic motion picture machine permitting the production of the titles.

Fig. 7 is a section on the line 7—7 of Fig. 5.

Fig. 8 is a section on the line 8—8 of Fig. 6.

Fig. 9 is a vertical section with parts in elevation of a motion picture photographic machine arranged for the practice of the present invention.

Fig. 10 is a face view of a means which may be employed for photographing the descriptive legends upon the film.

Fig. 11 is a perspective view illustrating a web with words thereon and sustaining spools with driving means for use in the production of progressively moved descriptive legends on the films.

Referring to the drawings there is shown in Figs. 1, 2 and 3 short strips of films 1, such as are employed in connection with motion picture machines, such films having the usual marginal perforations 2. In the various modifications of the invention the film may be that usually employed, but the arrangement of the pictures and legends varies in accordance with the method of manufacture.

In Fig. 1 the pictures are assumed to be in spaces 3 of the usual length crosswise of the film, but of less height than is customary. Ordinarily the height of the pictures is that agreeable to the space represented by four perforations 2, but in the arrangement of Fig. 1 the height of each picture is approximately that represented by three perforations, and neighboring pictures are separated by a space 4 corresponding approximately to the distance between two perforations so that the height of the picture plus the height of an intervening space between two pictures is equal to the customary height of a picture as ordinarily produced on a motion picture film.

Within the space between two adjacent pictures in the structure of Fig. 1 there is produced a legend 5 descriptive of the subject of the picture, and where a series of pictures relate to a common subject the legend will be the same.

It is advantageous to have the legend 5 appear white on a black background, so that there may be no intense glare, distracting to the eye of the observer, immediately adjacent to the picture being produced upon the screen. Of course, a suitable tinting may be employed within the space 4, in which case the legend may appear in black or contrasting color upon the space 4.

Under some circumstances the legend may consist of a single word if sufficiently descriptive, and in other cases it may consist of a phrase or even a whole sentence, and usually the space provided will be found large enough to permit a considerable number of words to be displayed, and still be of a size readily readable by an audience in an auditorium of the customary extent.

In Fig. 2 there are spaces 3ª which in height and width correspond to the usual size of picture employed in motion picture films, due allowance being made for the exaggeration of the showing of Fig. 2. Between the spaces 3ª is a space 4ª carrying a legend 5ª, and these spaces and legends correspond to the space 4 and legend 5 of the arrangement shown in Fig. 1. Since in Fig. 2 the picture space 3ª is of full size and the picture spaces are separated by the height of the space 4ª, a film of a certain length will have a less number of pictures thereon than with the arrangement shown in Fig. 1, but the pictures will in themselves be larger. The spacing of the perforations 2, however, remains the same as is customary and the feeding gear of the machine must therefore be correspondingly changed to cause the film to be fed five spaces instead of four between each exposure.

In Fig. 3 the film 1 has picture spaces 3 as in Fig. 1 and dividing spaces 4, but the legend may be made to "grow" thereupon and move across the film by producing separate portions 3ᵇ thereof in succession, so that the legend may form a running description or commentary on the pictures readily readable by the observer, but slowly moving across the screen, whereby a relatively large amount of descriptive matter may be displayed despite the fact that the available space between the pictures is limited and would prevent more than a small fraction of such descriptive matter being shown if the arrangement of the legend indicated in Figs. 1 and 2 were followed.

In Figs. 4 and 9 there is shown a known form of motion picture machine comprising a casing 6 provided with a lens 7 of the character employed in taking motion pictures, the showing of Figs. 4 and 9 being that of the photographing machine. Within the box or casing 6 and spaced from the front of the motion picture machine or camera, which front is indicated at 8, is a partition 9 having a passage 10 therethrough in line with the lens 7, and this passage is of a size corresponding to the picture to be produced. In front of the partition 9 and behind the lens 7 is a rotary shutter 11 with the customary passage 12 therethrough for causing the exposure of the film and behind the partition 9, that is on the side remote from the lens 7, is a film gate 13 upon which is mounted another gate 14 which may be opened up during focusing through a focusing tube 15, and when closed holds the film tightly against the aperture 10 while the film is being run. The film is actuated by claws 15ª connected by a link 16 to the shutter 11.

At suitable points in the camera are boxes 17, 18 for holding reels 19 upon one of which the film is initially wound, and upon the other of which it is wound after exposure. The film is actuated by a toothed drum 20 against which the film is held by idlers 21, 22, and this drum is mounted on a shaft 23 having a crank 24 at one end outside of the camera box 6, while the other end of this shaft is extended through the opposite side of the camera box and there is connected to and actuates a counter 25 for a purpose which will presently appear.

With a camera of known form such as shown in the drawings no material change in the structure is needed, and in order to leave unexposed portions of the film for the ultimate production of the legend, a plate 26 shown in Figs. 5 and 7 is provided, this plate being made fast to the front of the partition 9 by screws 27 or otherwise, and being formed with or having attached to it a lug or block 28 of a thickness to extend through the aperture 10 to the film 1, so that the effective area of the aperture 10 is correspondingly lessened, the lug being placed at the top of the aperture because of the inversion of the image by the photographic lens. At each exposure the film is subjected to light over a space corresponding to the space 3 of Fig. 1, while a space corresponding to the space 4 is protected from light and hence is still fully sensitive. When a film produced as just described is developed a negative is produced within the spaces 3, and the spaces 4 simply remain blank.

The counter 25, which may be taken as indicative of any means of accurately indicating the number of picture spaces which have been exposed, is observed before the taking of the pictures is begun, the front of the camera box is opened up, and the portion of the film then visible is marked by means of a punch provided with most motion picture cameras, but other means may be used for the same purpose. Knowing the condition of the counter 25 the taking of the pictures may be proceeded with, due notice being taken of the condition of the counter each time a scene changes, and if the machine be stopped at any time for a change of scene and refocusing, the exposed film may again be marked and due notice taken of the condition of the counter.

Now, the camera may be taken into the dark room and the film wound back upon the first reel and then threaded through the actuating parts of the camera until the first marked portion of the film is again in front of the lens. Now, the plate 26 is removed, and another plate 29 is secured by screws 30 in place of the plate 27 to the partition 9, but this plate has a lug 31 adapted to extend through the aperture 10 to the film and of a size corresponding to the portion of the film exposed on its first run through the camera, and a passage 31ª corresponding to the lug 28. Then the camera is focused upon a suitable legend 32 which by preference is light upon a dark background, or may be clear upon an opaque background and lighted from behind, the room in which the camera is operated being otherwise free from harmful actinic light. By observing the counter 25 the film may be moved through such a distance as the legend 32 may necessitate, and then by substituting another legend focused upon the hitherto unexposed spaces 4 of the film, the film is exposed to the second legend for an appropriate number of exposures, and the procedure is repeated as often as need be.

The legend 32 if of a transparent nature upon an opaque support may be illuminated by daylight or artificial light.

When the film is completed, it is developed in the usual way and prints are made in the usual way to produce positive films, but it will be found that each picture has thereunder a legend descriptive of the character of the scene shown by such picture. In the arrangement shown in Fig. 3 the legend will progress across the screen and the reading matter may be substantially continuous, but may be made to seemingly move at so slow a rate as to be readily readable by the observer. This can be brought about by photographing a movable legend upon an already exposed film, the legend appearing on the part of the film which remained unexposed and corresponding to the space 4 or 4ª, it being a simple matter to make the movement of the legend being photographed synchronize with the scenes photographed. In this way the story of the pictures may be exhibited upon the screen along with the production of the pictures on the screen and the story may be much fuller than would be the case where a single word or phrase is reproduced upon the screen to explain a relatively large series of individual pictures. Where the same words or phrases occur in conjunction with a considerable number of pictures, and then change, the transition is sudden, but in the case of the arrangement of Fig. 3 the descriptive matter may progress across the screen slowly and continuously at convenient reading speed, and the reader may obtain a much more complete description of the scenes presented upon the screen than heretofore, or by the arrangement of Figs. 1 and 2.

By having the desired legend upon a long support, which for convenience may be flexible so as to be windable upon drums, such legend may be made to move slowly in the proper direction, while the undeveloped film is exposed thereto with the plate 29 arranged as shown in Figs. 6 and 8.

Whether or not the pictures be of standard size upon the film there is provided a space between each two adjacent pictures about equal to the distance between the centers of two adjacent side perforations and the legend may be produced upon this blank space by photography, as described, or by direct printing from type or the like. In either case a record is kept of the first run of the film through the machine by means of pencil or other marks, and a counter or other such means, so that it may be determind at what points on the film the change or changes of wording are to occur. The legend receiving spaces are produced by masking appropriate portions of the film in the first run through the photographing machine, and when the legends are transferred to the film of photographs those parts of the film exposed during the first run are then masked and the intervening parts unexposed in the first run are masked in the second run. In the form shown in Fig. 2 masking is unnecessary while taking the picture, since the partition 9 itself then serves as a mask, the gearing being such that the film is fed a distance equal to five perforations instead of four, as is customary. However, masking is necessary while photographing the legends.

By the procedures hereinbefore described the legends are produced with the same clearness and sharpness as the pictures.

The legends may also be produced upon the negative film after exposure and upon the positive film after printing by photographing the legend directly upon either before development, the legend being photographed within the space occupied by the pictures, and without the necessity of using the plates or masks 26 or 29. This may be done with a photographic machine in a darkened chamber, or one illuminated by nonactinic light. In such case the legend is illuminated, as, for instance, by having the legend of transparent or translucent material through which actinic light may pass, and this legend then be focused upon the sensitive film and photographed thereon in the same manner as utilized for taking the original pictures. In this manner a legend is produced directly upon the picture itself, and while such procedure is useful it does not give as satisfactory results as when the legend is produced upon a space individual to it.

Another mode is to apply the plate or mask 26 to the aperture of the printing machine while the negative and the sensitive film are being run through in the usual manner, this permitting the use of negatives which have not been specially prepared with a view to the production of the legend. The result is that the positive film has unexposed spaces thereon permitting the exposure of these spaces for the production of the legends by again running the positive film through the printing machine with the mask 29 in place and either photographing the legend by means of a lens upon the unexposed portions of the positive film or printing the legends by means of a mask with the legend cut out thereon and said mask introduced into the space 31ª of the plate 29. The photographing of the legends upon such a partially unexposed film may be accomplished by an ordinary photographic machine through which the positive film is run with the aperture having the mask 29 applied thereto. In this last-named procedure the legends photographed would have to be reversed or turned wrong side to, and, of course, if the legends be in white letters they will show black on the positive when the letter is developed, or if in black letters on a white ground they will show white on an opaque ground when developed.

Still another procedure which may be followed is to run the film with blank spaces through a printing press provided with a suitable sprocket feed like that employed in motion picture machines and printing the legend directly from type, the printing being right or left handed in accordance with whether it be produced upon the positive or the negative film.

What is claimed is:—

1. The method of producing motion picture films which consists in exposing successive portions of the film to the scene to be photographed with intervening portions of the film protected against the action of actinic light, and then exposing the said protected portions to lens images of descriptive legends, at the same time protecting the previously exposed portions of the film from the action of actinic light.

2. The method of producing motion picture films, which consists in exposing a film to a scene or scenes to be photographed in successive fractional portions and at the same time protecting intervening portions against the action of actinic light, and then similarly exposing the film at the previously unexposed intervening portions to legends descriptive of the scenes photographed, the first exposed portions being protected from the effects of actinic light during the second series of exposures.

3. The method of preparing motion picture films, which consists in subjecting the film to a series of successive exposures to the scene or scenes to be photographed, the exposures being spaced apart by distances less than the height of the exposures lengthwise of the film, and the intervening spaces of the film being protected against the action of actinic light, and then photographing upon the intervening spaces a legend or legends descriptive of the scenes first photographed, with the first exposed portions of the film protected against the action of actinic light, then developing the film, and printing positive films from the negative so produced.

4. The method of producing motion picture films with descriptive legends accompanying the photographs, which consists in exposing successive portions of the film to the scene or scenes to be photographed with intervening spaces of the film between the exposed parts protected from the effects of actinic light, and then photographing a legend upon the intervening spaces while the first exposed portions are protected from the effects of actinic light, the legend being progressively displayed laterally of the film during the progress of the exposures to produce the effect of lateral movement of the legend upon the screen against which the images upon the finished positive film are projected.

5. The method of producing motion picture films which consists in exposing successive portions of a sensitive film to the scene to be photographed, with portions of the film between the successive exposed portions protected from actinic light, and then while the first exposed portions are protected from actinic light photographing upon the intervening portions successive images of descriptive legends progressively moved in a direction lateral to the length of the film.

In testimony that I claim the foregoing as my own, I have hereto affixed my signature in the presence of two witnesses.

LEE MILLER.

Witnesses:
H. J. CARTON,
J. B. WRIGHT.